United States Patent [19]

Wutherich

[11] 4,422,344

[45] Dec. 27, 1983

[54] LOAD PROPORTIONAL ANTIBACKLASH GEAR DRIVE SYSTEM

[75] Inventor: Hermann A. Wutherich, Rancho Palos Verdes, Calif.

[73] Assignee: The United States of America as represented by the Secretary of the Air Force, Washington, D.C.

[21] Appl. No.: 281,148

[22] Filed: Jul. 7, 1981

[51] Int. Cl.³ .................... F16H 55/18; F16H 57/00; F16H 55/12
[52] U.S. Cl. .................................. 74/409; 74/410; 74/411; 74/440; 74/444
[58] Field of Search ............... 74/409, 411, 440, 439, 74/444, 443, 460, 461, 410, 421 R, 414

[56] References Cited

U.S. PATENT DOCUMENTS

| | | | |
|---|---|---|---|
| 2,081,644 | 5/1937 | Smythe | 74/440 |
| 2,302,575 | 11/1942 | Romaine et al. | 74/409 |
| 2,663,198 | 12/1953 | Cairnes | 74/440 |
| 2,896,466 | 7/1959 | Wiseman | 74/409 |
| 3,020,775 | 2/1962 | Musser | 74/409 |
| 3,512,430 | 5/1970 | Sutherland | 74/713 |
| 3,535,949 | 10/1970 | Bauer | 74/440 |
| 3,545,296 | 12/1970 | Eggins | 74/410 |
| 4,072,064 | 2/1978 | Lloyd et al. | 74/409 |

*Primary Examiner*—Lawrence J. Staab
*Assistant Examiner*—Michael D. Bednarek
*Attorney, Agent, or Firm*—Donald J. Singer; Bobby D. Scearce

[57] ABSTRACT

A novel load proportional antibacklash gear drive system is provided wherein each portion of a split pinion gear is provided with a pressure chamber connected to a torque sensor and servo control unit for controlling the pressure applied individually to each split gear portion, against opposing tooth faces of the driven gear. The servo control unit provides high pressure (hydraulic or pneumatic) to a first split gear portion for drive in one direction while providing low pressure to the second split gear portion in the opposing rotational sense to maintain contact of the split gear with both faces of the driven gear at all times, thereby eliminating backlash. Upon reversal of the direction of rotation of the gear system, the servo unit provides high pressure to the second split gear portion which then acts as the driving gear, and maintains low pressure to the first split gear portion to maintain it in contact with the driven gear to prevent backlash upon reversal of the direction of drive of the gear system.

2 Claims, 2 Drawing Figures

LOAD PROPORTIONAL ANTIBACKLASH GEAR DRIVE SYSTEM

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This invention relates to copending patent application Ser. No. 281,149 (filed July 7, 1981) to the above named invention, now abandoned.

BACKGROUND OF THE INVENTION

This invention relates to gear assemblies and gear drive systems, and more particularly to gear drive assemblies configured to reduce or to eliminate backlash.

Considerable amounts of backlash may exist in conventional gear drive assemblies resulting from clearances between meshing teeth of gears in the drive system. Backlash may be provided in the gears during manufacture to avoid binding or excessive wear in the gear system, or may result from manufacturing tolerances or design criteria for a particular drive system. Backlach may also exist by reason of assembly clearances between bearing surfaces of the gears, shafts, and other members within the gear drive assembly.

In gear drive assemblies desired for use in reversible drive systems, the existence of backlash within the gear drive may not be tolerable, especially where accurate positioning of the drive system is required upon reversal of the direction of drive of the component gear members. Prior art gear drive assemblies configured to reduce backlash include the use of two counteroperating motor drive systems, having the disadvantages of significantly higher cost, and of inducing high internal loading and friction and commensurate excessive gear wear, especially with the use of high output motor drives. Another prior art configuration comprises mounting the drive motor pinion gear on a swingarm, preloading the swingarm and forcing the pinion into the driven gear, which reduces backlash, but at the same time increases friction and strain within the bearings, resulting in a relatively short useful life of the system. Another category of well known antibacklash gear drive configurations utilize split gears, such as disclosed by Bauer (U.S. Pat. No. 3,535,949), Eggins (U.S. Pat. No. 3,545,296), and Sutherland (U.S. Pat. No. 3,512,430), having means to angularly separate the gear teeth of one portion from the teeth of the other portion of the split gear, one portion of the split gear engaging the driven gear on one face of the teeth, and the other portion engaging the other face of the teeth of the driven gear. Relative angular or axial displacement of the two portions may be effected by various means. For example, in one such split gear configuration, one gear portion is fixed to the drive shaft, while the other portion is preloaded by means of a spring to achieve the desired degree of angular displacement of one portion relative to the other. With either direct spring load between the gear portions or with the use of helicoidal splines on the shaft, an inherent disadvantage exists that the preload must be greater than the maximum torque to be transmitted. The result, as in other prior art configurations, is constant high gear tooth loads, high friction, excessive tooth wear, and shortened useful gear life.

The invention described herein eliminates, or substantially reduces in critical importance, the foregoing problems in the prior art by providing a load proportional antibacklash gear drive system wherein a controlled variable force means locks the driving portion of a split gear to the drive shaft, while the other portion floats resiliently controlled by low pressure means into relative angular misalignment with the driving portion to engage both faces of the teeth of the driven gear. In reverse drive, the floating gear portion becomes the driving gear portion while the former driver portion floats in relative angular displacement to prevent backlash. Advantageous attributes of the present invention include the elimination of preload, increased efficiency of drive system operation, reduced friction and tooth wear, and extended tooth life.

The present invention employs two portions of a split pinion mounted on a common drive shaft to deliver torque to an engaged gear. Each pinion portion includes a pressure chamber. Hydraulic or pneumatic pressure moves the pinion portions axially apart and into relative angular misalignment upon engagement of the portions with a collar having V-shaped face teeth. The two pinion portions deliver torque in opposing directions, and therefore, full contact on both tooth faces of the driven gear results. At any given time during operation of the gear drive system of this invention, one of the pinion portions acts as the driver, while the other portion supplies minimum opposing torque to eliminate backlash, which minimizes gear tooth loading. The difference in pressure applied separately to the two pinion portions is proportional to the delivered torque.

The present invention therefore provides an antibacklash gear drive system utilizing a split pinion configuration wherein no mechanical preload on the two pinion portions is required to effect the angular displacement of the two portions sufficient to eliminate backlash, but wherein the applied pressure to effect the displacement is a proportionally controlled function of the applied torque. The applied pressure may be switched hydraulically or pneumatically from one pinion portion to the other upon reversal of the drive system.

It is, therefore, an object of this invention to provide a gear drive system having no backlash in the gears.

It is a further object of this invention to provide an antibacklash gear drive system using a split gear configuration not requiring mechanical preload on the two portions of the split gear.

It is a still further object of this invention to provide an antibacklash gear drive system wherein hydraulic or pneumatic pressure is applied to the split gear portions to effect relative angular displacement of the two portions to eliminate backlash, and wherein the applied pressure is proportional to the torque delivered to the drive system, to minimize gear tooth loading and tooth wear.

These and other objects of the invention will become apparent as the detailed description of certain preferred embodiments thereof proceeds.

SUMMARY OF THE INVENTION

In accordance with the foregoing principles and objects of the present invention, a novel load proportional antibacklash gear drive system is provided wherein each portion of a split pinion gear is provided with a pressure chamber connected to a torque sensor and servo control unit for controlling the pressure applied individually to each split gear portion, against opposing tooth faces of the driven gear. The servo control unit provides high pressure (hydraulic or pneumatic) to a first split gear portion for drive in one direction while providing low pressure to the second split gear portion in the opposing rotational sense to maintain contact of the split gear with both faces of the driven gear at all times, thereby eliminating backlash. Upon reversal of the direction of the gear system, the servo unit provides high pressure to the second split gear portion which then acts as the driving gear, and maintains low pressure to the first split gear portion to maintain it in contact with the driven gear to prevent backlash upon reversal of the direction of drive of the gear system.

DESCRIPTION OF THE DRAWINGS

The invention will be more clearly understood from the following detailed description of specific embodiments thereof read in conjunction with the accompanying drawings wherein.

DETAILED DESCRIPTION

Figure 1:
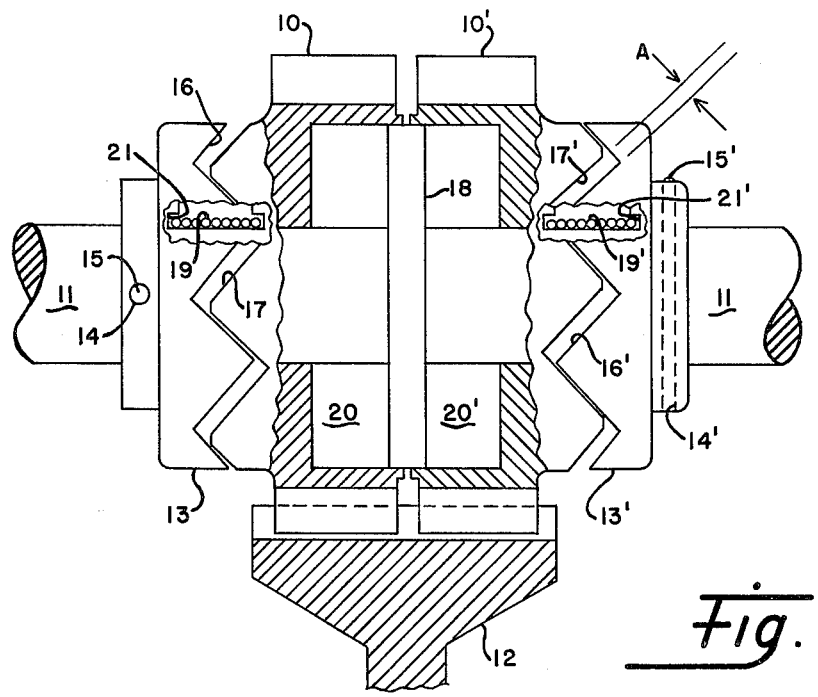
FIG. 1 is a schematic diagram partly in section of one embodiment of the novel split gear configuration of this invention.

Referring now to the drawings, the invention may be conveniently understood by examination of the embodiment shown in FIG. 1. A composite of two split pinion gear portions 10-10' are piloted on drive shaft 11 and drive driven gear 12. Torque is delivered by drive shaft 11 from a motor system (not shown). Shaft 11 carries toothed rings or clutches 13-13' which are rigidly fixed to drive shaft 11 by suitable means such as diametric bores 14-14' and pins 15-15'. Rings 13-13' have on their confronting faces radially cut V-shaped face teeth 16-16'. Split pinion gear portions 10-10' have on their sides facing toothed rings 13-13' matching radial V-shaped face teeth 17-17', such that torque delivered to drive shaft 11 is transmitted to split gear portions 10-10' through the meshing of face teeth 16 of ring 13 with matching face teeth 17 of gear portion 10, and the meshing of face teeth 16' of ring 13' with matching face teeth 17' of gear portion 10'.

Rings 13-13' are secured to shaft 11 in a spaced relationship from full engagement with their mating gear portions 10-10' to yield a gap A larger than the backlash between gear portions 10-10' and driven gear 12 to be corrected. Centering springs 19-19' are disposed around shaft 11 within annular spaces 21-21' to center gear portions 10-10' between the confronting faces of rings 13-13' when the system is not pressurized as hereinbelow described.

The function served by rings 13-13' may alternatively be served by providing helicoidal splines (not shown) on drive shaft 11 for mating with splines which may be provided on the inside bores of gear portions 10-10' adjacent shaft 11, although the use of V-shaped faced teeth as described is preferred.

Drive shaft 11 has intermediate the gear portions 10-10' a diametric enlargement in the form of piston 18. Gear portions 10-10' have cylindrical cavities or chambers 20-20' for receiving piston 18 as shown.

Means (not shown in FIG. 1) are provided, such as by passages in the drive shaft as hereinbelow discussed with relation to FIG. 2, to impart hydraulic or pneumatic pressure to the pressure chambers defined by piston 18 and chambers 20-20'. As pressure is applied to the chambers, gear portions 10-10' are forced axially separate into engagement with rings 13-13'. As gear portions 10-10' mesh with rings 13-13', the relative positions of the teeth on the faces of rings 13-13' cause gear portions 10-10' to rotate in opposite directions until the peripheral meshing teeth of gear portion 10 engage one face of the peripheral gear teeth on driven gear 12 and the peripheral teeth of gear portion 10' engage the other face of the peripheral teeth of driven gear 12, at which point gear portions 10-10' are restrained from further relative rotation and the backlash between driven gear 12 and the composite of gear portions 10-10' is eliminated.

Figure 2:
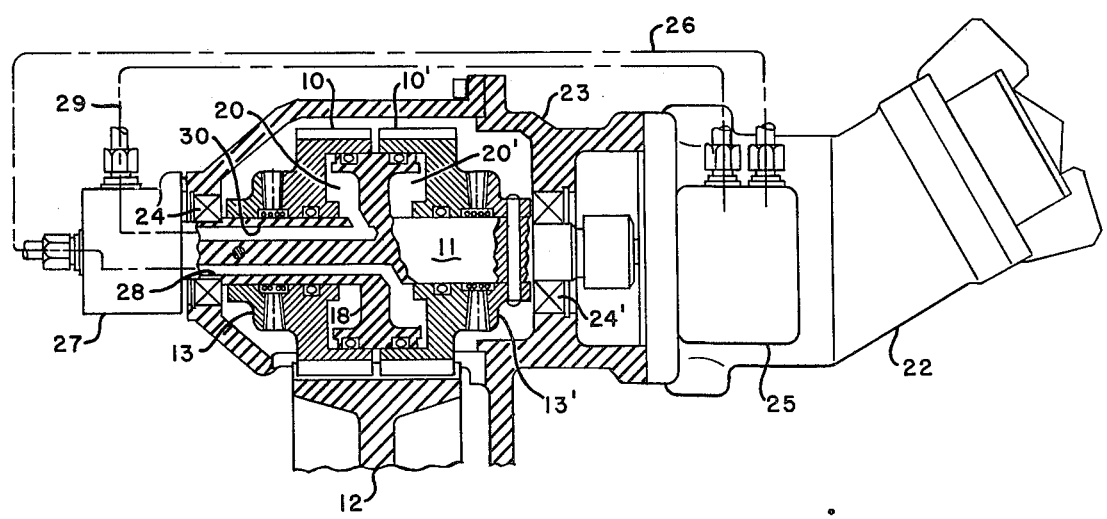
FIG. 2 is a side elevational view partly in section of a single gear train system incorporating the split gear configuration of the embodiment of FIG. 1.

Referring now to FIG. 2 of the drawings, wherein like numerals refer to like parts of FIG. 1, a typical single mesh gear train is shown including the novel antibacklash gear drive configuration of this invention. As shown in FIG. 2, motor 22 may be provided to drive drive shaft 11 which may be journalled into housing 23 conventionally, such as through bearings 24-24'. Unconventional split gear portions 10-10' and rings 13-13' are driven by shaft 11 in the manner described above in relation to FIG. 1, to impart drive to driven gear 12. Assuming a counterclockwise drive, torque is applied by motor 22 to drive shaft 11. Torque sensor and servo control unit 25 directs pressure (either hydraulic or pneumatic) proportional to the torque applied by motor 22 by way of line 26, rotary union 27 and passageway 28 in shaft 11 to pressure chamber 20' formed by the recess cavity in split pinion gear portion 10' and enlarged shaft portion or piston 18. Gear portion 10' in this configuration therefore acts as the driver for counterclockwise rotation of drive shaft 11. While pressure is applied to chamber 20' for drive by gear portion 10', corresponding pressure chamber 20 associated with the other gear portion 10 is vented to the return line 29 of servo control unit 25 via passageway 30 provided within shaft 11 and rotary union 27. Low pressure is maintained throughout operation in return line 29 to maintain gear portion 10 meshed with ring 13 to maintain controlled pressure meshing of gear portion 10 with driven gear 12. When motor 22 is commanded into clockwise drive, servo control unit 25 senses the torque and reverses the pressure applied to chambers 20-20', allowing high pressure into chamber 20 of gear portion 10, which then assumes the role as driver for clockwise drive on driven gear 12. During clockwise drive, chamber 20' of gear portion 13' sees low pressure from servo control unit 25 and thus contact is maintained between gear portion 13' with driven gear 12 in the counterclockwise sense to eliminate backlash.

The present invention as hereinabove described therefore provides a novel load proportional antibacklash gear drive system wherein loading on the driven gear is proportional to the applied torque.

It is understood that the invention described herein may be alternatively configured within the scope of the appended claims, as might occur to one with skill in the field of the present invention. Therefore, all embodiments contemplated hereunder have not been shown in complete detail. Other embodiments may be developed without departing from the spirit and scope of the appended claims.

I claim:

1. A load proportional antibacklash single step gear drive system for transmitting to a driven gear torque applied to a rotating drive shaft which comprises:
   a. a split pinion gear supported by said drive shaft, said gear having a first pinion half and a second pinion half axially spaced on said shaft, each of said halves having a first tooth means for engaging said driven gear and a second tooth means;
   b. a first driving member, mounted for rotation with said drive shaft, and having tooth means for driving engagement with said second tooth means of said first pinion half;
   c. a second driving member, mounted for rotation with said drive shaft, and having tooth means for backlash eliminating engagement with said second tooth means of said second pinion half in opposite rotational sense to said first driving member; and
   d. means, responsive to the applied torque on said drive shaft, for urging said first pinion half into engagement with said first driving member, and for urging said second pinion half into engagement with said second driving member.

2. The gear drive system as recited in claim 1 wherein said means for urging said first pinion half into engagement with said first driving member, and for urging said second pinion half into engagement with said second driving member comprises:
   a. means defining a pair of passageways along said drive shaft;
   b. means defining a first expandable pressure chamber adjacent said first pinion half, and a second expandable pressure chamber adjacent said second pinion half; and
   c. a torque sensor and servo control means, adjacent said drive shaft, for sensing the torque on said drive shaft and providing high fluid pressure to said first pressure chamber and low fluid pressure to said second pressure chamber, said control means communicating with said first pressure chamber through one said passageway and with said second pressure chamber through the other said passageway.

* * * * *